United States Patent
Mazzawi et al.

(10) Patent No.: US 9,430,599 B2
(45) Date of Patent: Aug. 30, 2016

(54) DETERMINING SOFT ERROR INFLICTION PROBABILITY

(71) Applicant: Optima Design Automation Ltd, Nazareth (IL)

(72) Inventors: Jamil Raja Mazzawi, Nazareth (IL); Ayman Kamil Mouallem, Mi'ilya (IL)

(73) Assignee: OPTIMA DESIGN AUTOMATION LTD, Nazareth (IL)

( * ) Notice: Subject to any disclaimer, the term of this patent is extended or adjusted under 35 U.S.C. 154(b) by 9 days.

(21) Appl. No.: 14/601,312

(22) Filed: Jan. 21, 2015

(65) Prior Publication Data

US 2015/0234967 A1    Aug. 20, 2015

Related U.S. Application Data

(60) Provisional application No. 61/941,125, filed on Feb. 18, 2014.

(51) Int. Cl.
G06F 17/50 (2006.01)

(52) U.S. Cl.
CPC ....... *G06F 17/5045* (2013.01); *G06F 17/5022* (2013.01); *G06F 17/5031* (2013.01); *G06F 2217/84* (2013.01)

(58) Field of Classification Search
USPC ........ 716/136, 100, 106, 108, 110–113, 132, 716/134
See application file for complete search history.

(56) References Cited

U.S. PATENT DOCUMENTS

| | | | | |
|---|---|---|---|---|
| 7,260,742 | B2* | 8/2007 | Czajkowski | G06F 11/1497 714/17 |
| 8,489,919 | B2* | 7/2013 | Clark | G06F 9/3867 714/10 |
| 2007/0162798 | A1* | 7/2007 | Das | G06F 11/0721 714/724 |
| 2011/0145771 | A1* | 6/2011 | Lamb | G06F 17/5009 716/108 |
| 2013/0096902 | A1* | 4/2013 | Bose | G01R 31/31835 703/14 |
| 2014/0258598 | A1* | 9/2014 | Canepa | G06F 3/0683 711/103 |

\* cited by examiner

*Primary Examiner* — Stacy Whitmore
(74) *Attorney, Agent, or Firm* — Tutunjian & Bitteto, P.C.

(57) ABSTRACT

A method, system and product for determining error infliction probability or probability. The method comprises obtaining a representation of a circuit, wherein the circuit comprises nodes, wherein the nodes comprise at least one critical node; obtaining a trace, wherein the trace comprises recorded values of the nodes in a plurality of cycles; determining, by a processor, a Soft Error Infliction Probability (SEIP) of a node, wherein the SEIP is a value representing a probability that a Single Event Upset (SEU) effecting the node in a cycle will inflict a soft error by propagating through the circuit to the at least one critical node, wherein said determining comprises simulating a propagation of the SEU from the cycle to consecutive cycles, wherein said simulating utilizes values from the trace which are associated with the consecutive cycles; and outputting the SEIP of the node.

16 Claims, 5 Drawing Sheets

DETERMINING SOFT ERROR INFLICTION PROBABILITY

CROSS-REFERENCE TO RELATED APPLICATION

This application claims the benefit of U.S. Provisional Application No. 61/941,125 filed Feb. 18, 2014, entitled "ERROR INJECTION ENGINE", which is hereby incorporated by reference in its entirety.

TECHNICAL FIELD

The present disclosure relates to microelectronic design in general, and to designing circuit that reduce a risk of soft error as a result of a Single Event Upset, in particular.

BACKGROUND

Single Event Upset (SEU) is a phenomena of memory element inside an electronic chip flip its value, for any reason, one of them is radiation related to cosmic ray and nuclear particles coming from space, mostly from the Sun. The SEU itself may not permanently damage the device its strikes, but it can cause a memory glitch (bit flip) that disturbs an expected functionality of the device. These radiation induced SEUs cause memory glitch by bit flipping the output of a single memory element. It will be noted, however, that SEU can spontaneously occur in any circuit due to other reasons as well.

Soft error occurs when a bit flip affects an electronic device operation in a substantive manner. Soft errors pose a major challenge for the design of Very-Large-Scale Integration (VLSI) circuits, and more particularly so in technologies smaller than about 90 nm. In other words, smaller technology in a dense microelectronics Integrated Circuit (IC) are more sensitive to this radiation, and this may spell higher probability of SEUs to occur. Another significant factor affecting this probability is, the distance of the electronic device from the face of our plant, such as, avionics devices installed in high altitude aircrafts and space gears. The deeper in space the device operates, the more exposed to radiation interactions it become.

Since most semiconductor components are susceptible to radiation damage, a need for radiation-hardened components evolved. These radiation-hardened initially targeted the military and space industries were based on their commercial equivalents, with some design variations that reduce the susceptibility to radiation damage. Memory IC hardening may comprise, error correcting memory using additional parity or Error Correction Code (ECC) bits and a "scrubber" circuit to continuously sweep the memory cells. Redundant processing and logic elements may be used to replace a single memory element with three memory elements and separate "voting logic" between them to continuously determine its result, this way, if one of the three elements got hit by SEU, the voting will clear the error immediately. However, as technologies get smaller these hardening techniques are charging a high price of power consumption; performance (e.g., speed, heat); silicon real estate; extensive development and testing; or the like.

BRIEF SUMMARY

One exemplary embodiment of the disclosed subject matter is a computer-implemented method comprising: obtaining a representation of a circuit, wherein the circuit comprises nodes, wherein the nodes comprise at least one critical node; obtaining a trace, wherein the trace comprises recorded values of the nodes in a plurality of cycles; determining, by a processor, a Soft Error Infliction Probability (SEIP) of a node, wherein the SEIP is a value representing a probability that a Single Event Upset (SEU) effecting the node in a cycle will inflict a soft error by propagating through the circuit to the at least one critical node, wherein said determining comprises simulating a propagation of the SEU from the cycle to consecutive cycles, wherein said simulating utilizes values from the trace which are associated with the consecutive cycles; and outputting the SEIP of the node.

Optionally, said simulating the propagation of the SEU is preformed until reaching a halting condition, wherein the halting condition is selected from the group consisting of: the SEU propagated to the at least one critical node; and the SEU stopped propagating.

Optionally, said outputting comprises outputting a hardening recommendation for the node, wherein the hardening recommendation is based on the SEIP of the node.

Optionally, the method further comprises: in response to determining that the SEIP is within a first range, outputting a recommendation to use a first hardening technique on the node; and in response to determining that the SEIP is within a second range, outputting a recommendation to use a second hardening technique on the node.

Optionally, said determining is preformed with respect to a plurality of nodes comprised in the circuit, whereby a SEIP is determined for each node of the plurality of nodes, wherein said outputting comprises outputting a list of the plurality of the nodes and associated SEIP values of the plurality of nodes.

Optionally, the trace is a typical trace representing a typical operation of the circuit.

Optionally, a discrepancy between a simulated value and a recorded value of the critical node at a same cycle of the trace indicates a soft error.

Optionally, the critical node is a conditional critical node having a condition on values of the circuit, wherein the condition is enabled in an enabling cycle, wherein the condition is held at the enabling cycle; wherein a discrepancy between a simulated value and a recorded value of a conditional critical node at the enabling cycle indicates soft error.

Optionally, said simulating is performed until reaching at least one threshold selected from the group consisting of: a maximum number of inverted values within a simulated cycle; a maximum number of inverted values during said simulating; and a maximum number of simulated cycles during said simulating; and wherein in response to reaching the threshold, approximating that the SEU inflicts a soft error.

Optionally, said simulating the propagation of the SEU is preformed until the SEU propagates to a second node having an SEIP above a threshold value, and wherein in response to the SEU propagating to the second node, approximating that the SEU inflicts a soft error.

Optionally, said determining the SEIP of the node further comprises: for each cycle of a plurality of cycles in the trace: simulating an SEU to the node in the cycle; and simulating propagation of the SEU to determine whether the SEU inflicts a soft error; and computing the SEIP of the node by using the formula N/M, wherein N is a total number of soft errors inflicted by the simulated SEUs, wherein M is a total number goof simulated SEUs to the node.

Optionally, said determining the SEIP of the node further comprises: determining that at least one simulation of the SEU to the node in the cycle is inconclusive as to indicating an infliction of a soft error; and wherein said computing is performed while ignoring the at least one inconclusive simulation.

Optionally, said simulating further comprises repeatedly computing values of the nodes in a second cycle based on a first cycle and based on the trace, wherein said computing the values of the nodes in the second cycle comprises: having a first portion of the nodes whose values in the first cycle are inverted with respect to recorded values of the trace; determining a second portion of the nodes whose values in the second cycle are influenced by the values of the first portion in the first cycle; computing values of the second portion using recorded values of the trace in the first cycle for any node not in the first portion and using inverted values of recorded values of the trace in the first cycle for any node in the first portion; comparing values of the second portion to identify a third portion of the nodes whose values in the second cycle are inverted with respect to recorded values of the trace.

Optionally, said simulating is performed until the third portion either includes the critical node or until the third portion is empty.

Optionally, the node is a flop or a latch.

Optionally, said simulating is performed by computing, in each cycle, values only to a subset of the nodes and using recorded values from the trace for other nodes not in the subset, wherein the subset of the nodes includes the nodes whose value is potentially effected by nodes whose simulated values in a previous cycle are different than corresponding recorded values in the trace.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
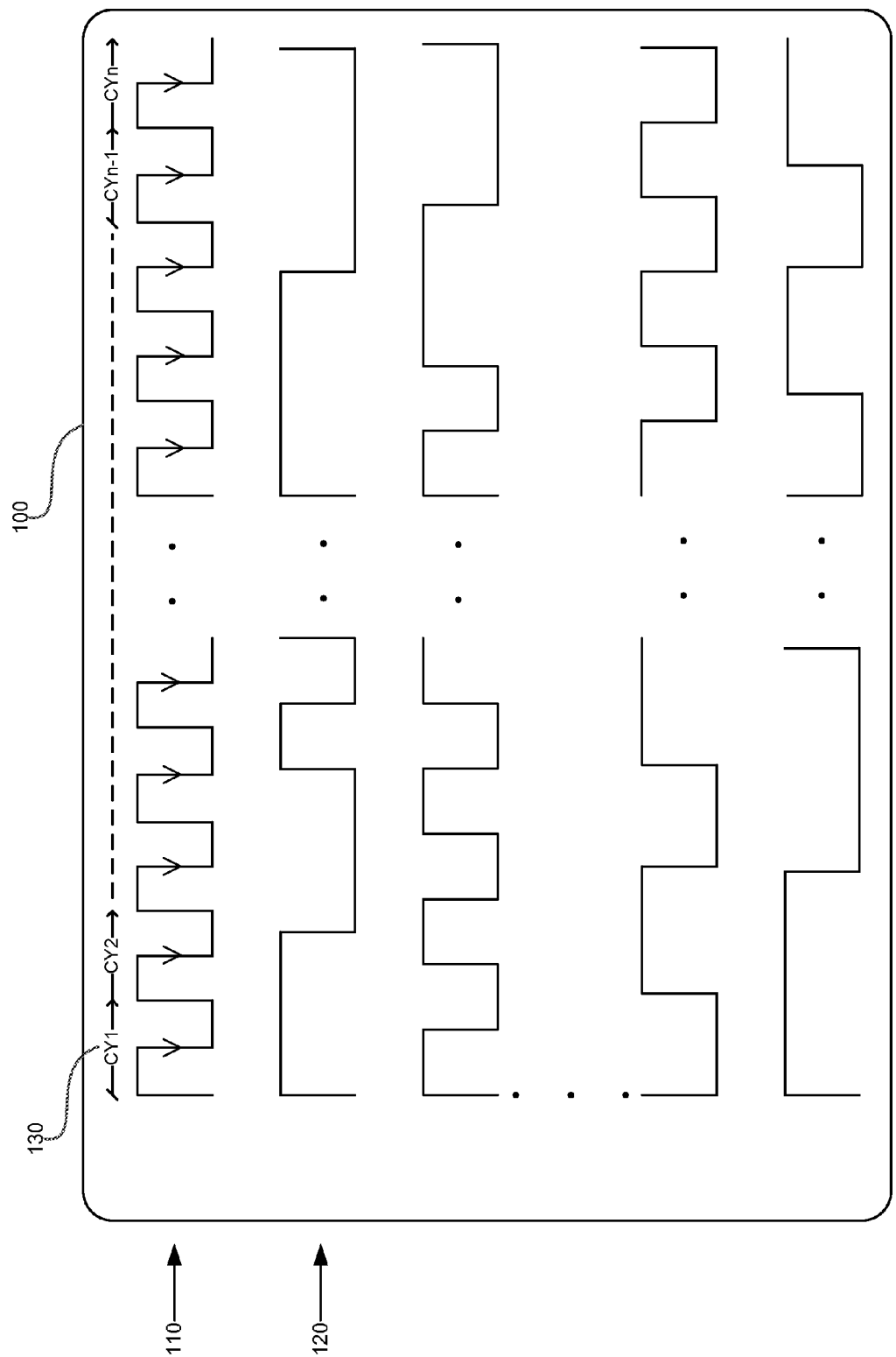
FIG. 1 shows an illustration of a trace, in accordance with some exemplary embodiments of the subject matter.

In the present disclosure the term "Single Event Upset" refers to a memory glitch in a single memory element (e.g., flip-flop, a latch, or the like) of a circuit which flips its value at a cycle. The Single Event Upset (SEU) may be caused by electromagnetic radiation striking a sensitive node in the digital circuit, such as, a microprocessor, or the like. The bit flip may be a result of the free charge created by ionization in or close to a memory element (e.g. flip-flop). The SEU may occur spontaneously and unexpectedly due to an environment in which the circuit is operated.

A soft error may be a disruption of the circuit's operation caused as a result of an SEU. The disruption of the circuit's operation may be: outputting a wrong result, a malfunction, producing wrong calculation, bringing the circuit to a halt, enter a deadlock or a live-lock state, a combination thereof, or the like.

One technical problem dealt with by the disclosed subject matter is to identify memory elements to be protected (or hardened) from SEUs in order to reduce the probability of soft errors. Traditionally, a utilization of blanket hardening solution may be used, (e.g., hardening all memory elements of the circuit). However, the tradeoff between protecting all memory elements on one hand and increasing the circuit's real-estate, power consumption and cost on the other may be counterproductive. In addition, increasing the real-estate and the power consumption of circuits may introduce a new set of problems that may be even more problematic than the soft error problem. In some exemplary embodiments, not all of the memory elements are shielded from SEUs. By selectively protecting a sub-portion of the memory elements of the circuit design, power consumption of the circuit is reduced. Real-estate inflation is reduced and associated costs thereof are also reduced.

One technical solution is to provide a user (e.g., chip-designer) with recommendations regarding selective hardening of memory elements of the circuit. It should be noted that not all SEU striking the circuit may inflict a soft error. In some exemplary embodiments, a probability that an SEU striking a specific node will inflict a soft error may be computed or estimated. Such probability may be referred to as Soft Error Infliction Probability (SEIP). Based on computed probabilities, recommendations may be provided as to which of the memory elements should be protected against SEUs. In some exemplary embodiments, an SEU may be simulated in a memory element and the simulation may be used to determine whether the SEU propagated and inflicted a soft error. Using the outcomes of several such simulations, the probability may be computed for the memory element. In some exemplary embodiments, the user may be provided with selective hardening recommendations based on the probability of each memory element in the circuit.

In some exemplary embodiments, the disclosed subject matter may be used with respect to a portion of the circuit and not the entire circuit design. In some exemplary embodiments, the portion of the circuit may be a specific scope of the circuit.

One technical effect of utilizing the disclosed subject matter is assisting the user to perform selective hardening. The user may knowingly select to invest in protecting some memory elements in view of their susceptibility to inflict soft errors.

Referring now to FIG. 1 showing an illustration of a trace, in accordance with some exemplary embodiments of the subject matter;

A Trace 100 may be used to represent recorded values of signal in a circuit design, such as for example, a microprocessor, or the like. Trace 100 may be visualized as snapshot of a state machine that reveals the behavior of memory elements and inputs to the circuit at each given cycle of the trace. In some exemplary embodiments, Trace 100 may be a file comprising recorded binary values in an execution of the circuit, such as Circuit 200 of FIG. 2. The values of the trace may be calculated throughout a software simulation process of the circuit. Additionally or alternatively, the trace may be captured by a logic analyzer from an actual execution of the circuit.

In some exemplary embodiments, Trace 100 may be a typical trace. The typical trace may be representing a simulation of typical operation of the circuit. In this disclosed subject matter the term typical operation may be used to describe common operation, process that takes place most of the time, process the is performed in average over a predetermined percentage of the time, or the like. As an example, the circuit may be configured as Motion Control Unit (MCU) of a radar system. The MCU normally operates 95% of the time in scanning area of interest, while only 5% of its operation time may be used for initialization. Hence, the trace excluding the initializing time segment may be the typical trace. Additionally or alternatively, the typical trace may exclude initialization processes, handling of exceptions, shutdown operations, boot cycles, or the like.

In some exemplary embodiments, the typical trace may be used as a base line representing an expected operation of the design. While any trace whether typical or not can be used, typical trace may produce better results. In some exemplary embodiments, multiple traces can be used. For example, Worst case values may be used: the calculation of the SEIP is performed on each flop on each of traces, then the highest SEIP between them is used for this flop. As another example, the values may be combined: the sum of N and M from all traces are used in calculating SEIP=N/M In some exemplary embodiments, Trace 100 may comprise a Clock Signal 110. Clock Signal 110 may be used as a synchronous clock used to define cycles of the circuit. In some exemplary embodiments, Trace 100 may comprise a finite number of cycles, where each one of them may be sequentially numbered. In some exemplary embodiments, the length of a trace may be determined by the number of cycles. Additionally or alternatively, only a portion of Trace 100 may be of interest, such as one or more portions thereof that represent cycles of the typical trace. In some exemplary embodiments, predetermined marking cycles may be set to indicate boundaries of a Region of Interest (ROI) within the trace, thereby used to indicate a portion of the trace which is considered to be the typical trace.

In some exemplary embodiments, Trace 100 may comprise signals for elements of the circuit, such as Signal 120. In some exemplary embodiments, Signal 120 may be a signal indicating the state of an element of the circuit that is referred to as a "node". The node may be a memory element, an output of the circuit or a portion thereof, an input to the circuit or a portion thereof, or the like. Signal 120 may indicate a value for each cycle, such as for example the value at $CY_1$ 130.

It should be noted that in the present disclosure the term "flop" may refer to a memory element, such as for example, a flip-flop, a register, a latch, a counter, a digital element having the capability to retain its value, or the like.

Figure 2:
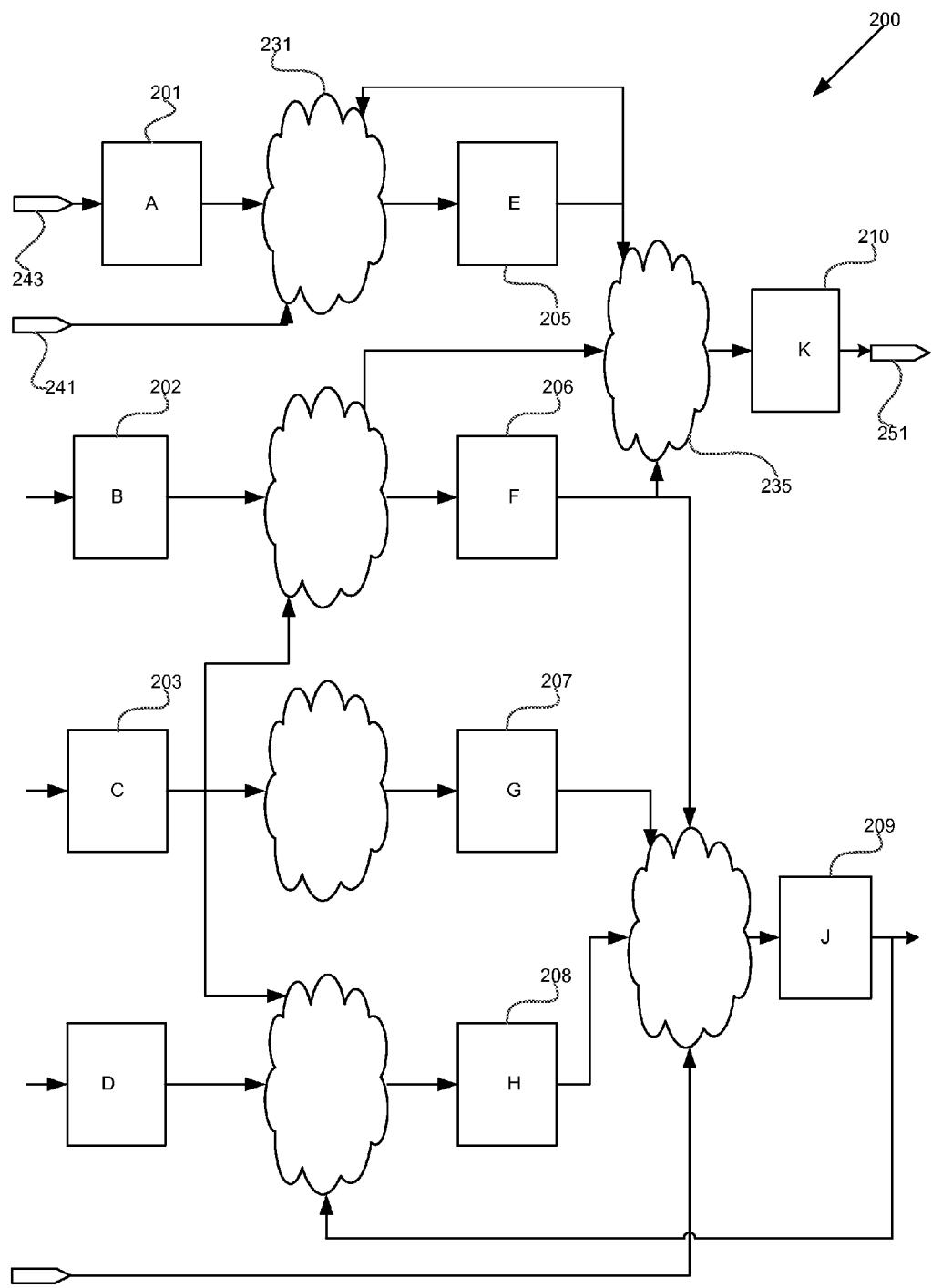
FIG. 2 shows an illustration of a circuit, in accordance with some exemplary embodiments of the subject matter.

Additionally or alternatively, Signal 120 may be associated to an output of a flop, such as, Flop 201 of FIG. 2, and retain the same value as the flop. In some exemplary embodiments, the value of the Signal 120 may be cycle dependent and may change from cycle to cycle. As an example the value of Signal 120 may be "1" in cycles $CY_1$ 130 and in $CY_2$, while in $CY_{n-1}$ and $CY_n$, the value of Signal 120 is "0".

In some exemplary embodiments, some signals of Trace 100 may be associated with nodes of the circuit. In some exemplary embodiments, a signal, such as Signal 120, may be associated with a critical node. The critical node of the circuit may be a node that if its value is affected by an SEU, a soft error is considered to be inflicted. As an example, the critical node may be an output of the circuit whose value is considered important to the operation of the circuit. In some exemplary embodiments, the critical node may be a conditional critical node, which is only critical in cycles where a predetermined condition is held (e.g., the condition is true). A cycle in which the condition is held may be referred to as a enabling cycle with respect to the conditional critical node.

Referring now to FIG. 2 showing an illustration of a circuit, in accordance with some exemplary embodiments of the subject matter.

A Circuit 200 may be a design representation of a circuit. The design depicted in Circuit 200 may comprise hardware elements and conductors linking them to one another. In some exemplary embodiments, Circuit 200 may be obtained in the form of one or more electronic design files, for example, a Netlist file, Register Transfer Level (RTL), Hardware Description Language (HDL) like Verilog or VHDL, a combination thereof, or the like.

In some exemplary embodiments, Circuit 200 may comprise flops, such as Flop 201. Flop 201 may be a memory element, such as for example, a flip-flop, a register, a latch, a counter, a digital element having the capability to retain its value or the like. Flop 201 may have an input, an output and a clock input (not shown). The output of the flop, also referred to as a state of the flop, may sample the value of its input on each cycle (e.g. clock tick). As a result, the flop retains its value until a next cycle.

In some exemplary embodiments, the input of the flop may be connected to an output of a different flop (not shown). Additionally or alternatively, the input of the flop may be connected to an input-port of the circuit, for example, Input-Port 243 is connected to the input of Flop 201. Additionally or alternatively, the input of the flop may be connected to a combinatorial-logic (combo-logic), for example, Combo-Logic 231 may be connected to the input of Flop 205. It will be noted that other wires may be connected to the input of the Flop. In some exemplary embodiments, the output of the flop may be connected to the input of a different flop (not shown). Additionally or alternatively, the output of the flop may be connected to an output-port of the circuit. As an example, output of Flop 210 is connected to Output-Port 251. Additionally or alternatively, the output of the flop may be connected to a combo-logic. For example, output of Flop 201 is connected to Combo-Logic 231. It will be noted that other wires may be connected to the output of the Flop. A combo-logic cloud, may have a single outputs or multiple output, each output represent a logical formula of the inputs to the Combo-Logic cloud.

In some exemplary embodiments, Circuit 200 may comprise a combo-logic, such as Combo-Logic 231. Combo-Logic 231 may comprise, non memory elements; logic gates, such as for example, AND gate, OR gate, NOT gate, NAND gate, NOR gate, XOR gate; a combination thereof, or the like. The combo-logic may be connected to any input or output of any element of the circuit. In some exemplary embodiments, the combo-logic may not have the capability to retain the value of its elements in a consecutive cycle.

In some exemplary embodiments, Circuit 200 may comprise input-ports such as Input-Port 241. In some exemplary embodiments, input-ports may be used to receive signals from a different circuit, a different portion of the same circuit, an external device, or the like.

In some exemplary embodiments, Circuit 200 may comprise output-ports such as Output-Port 251. In some exemplary embodiments, output-ports may be used to transmit signals to a different circuit, a different portion of the same circuit, an external device, or the like.

In some exemplary embodiments, Flops 201, 202, 203, 205 and 206 and Input-Ports 243 and 241 may be in the Logic Of Influence (LOI) of Flop 210. Put differently, the LOI of Flop 210 may comprise all the nodes having direct or indirect path to the input of Flop 210 and, therefore, may influence Flop 210.

In some exemplary embodiments, Flop 201, Flop 205, and Input-Port 241 may be in an immediate LOI of Flop 205. Put differently, the immediate LOI of Flop 205 may comprise all the nodes having direct path, including through combo logic, to the input of Flop 205 and, therefore, may influence Flop 205 in the following cycle.

In some exemplary embodiments, Output-Port 251 and Flops 206, 207, 208, 209 and 210 may be in the load of Flop 203. Put differently, the load of Flop 3 may comprise all the nodes having direct or indirect path from the output of Flop 210 and, therefore, may be influenced by Flop 210.

In some exemplary embodiments, Flop 206, 207, 208 and 210 may be in an immediate load of Flop 203. Put differently, the immediate load of Flop 203 may comprise all the nodes having direct path, including through combo logic, from the output of Flop 203 and, therefore, may be influenced by Flop 203 in the following cycle.

Figure 3:
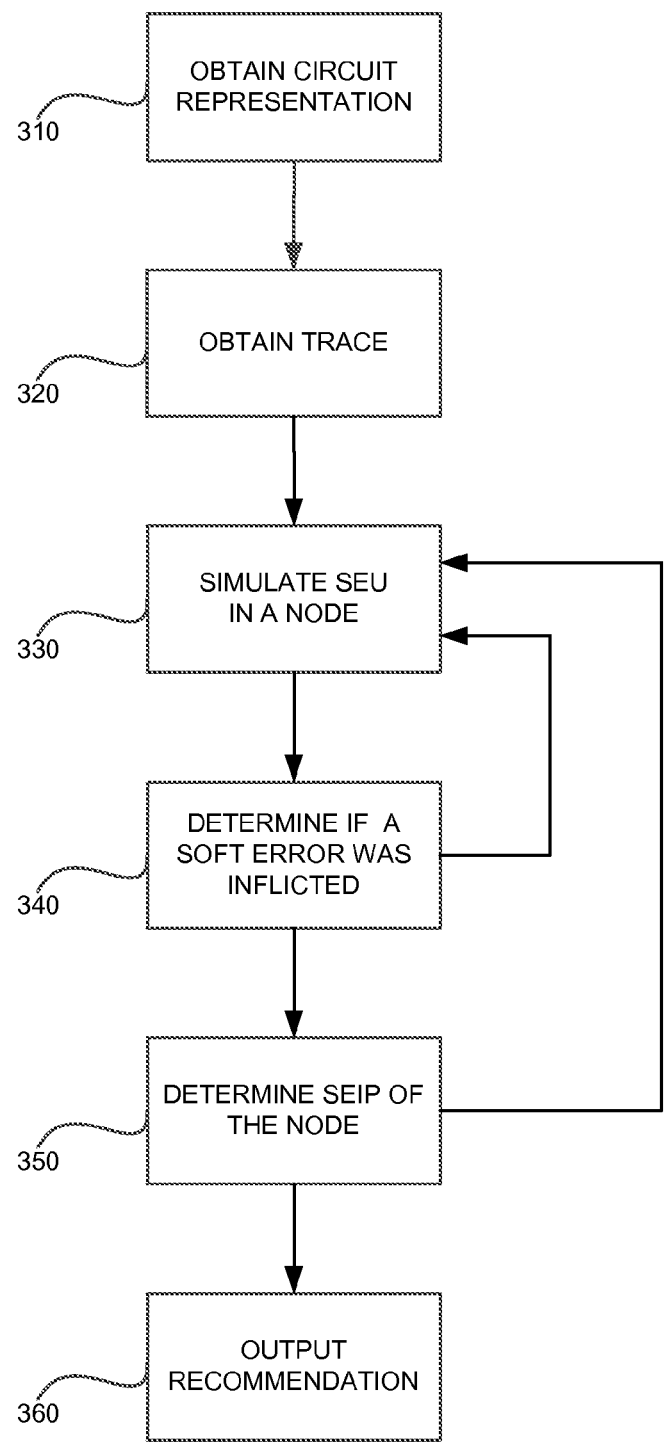
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In Step 310, a representation of the circuit may be obtained. The representation of a circuit design, such as, Circuit 200 of FIG. 2, may comprise nodes. Some of the nodes may be critical nodes and/or conditional critical nodes. In some exemplary embodiments, an indication as to which node is a critical node may be obtained, such as for example, received as an input from the user or obtained from a digital representation of the circuit. Additionally or alternatively, a condition of a conditional critical node may be obtained.

Additionally or alternatively, the circuit may be a portion of a circuit design, such as for example a unit within a system. The circuit obtained in Step 310 may be the portion of the circuit being analyzed in accordance with the disclosed subject matter. The portion being analyzed may be referred to as a scope within the design. In some exemplary embodiments, an SEU propagating in other portion of the circuit design may never result in soft errors or may not be of interest. Additionally or alternatively, other portions of the circuit design may already have a hardening solution and therefore may not be analyzed.

In Step 320, a trace may be obtained. The trace, such as Trace 100 of FIG. 1, may comprise recorded values of the nodes in a plurality of cycles. The trace may be represented by at least one trace file. The at least one trace file may represent a typical operation of the circuit design. Additionally or alternatively, the one or more trace files may comprise also non-typical cycles of the circuit, which may or may not be excluded such as using markers indicating the boundaries of the typical trace. In some exemplary embodiments, a user may determine one or more ROIs segments of the trace.

In Step 330, an SEU may be simulated. The SEU may be simulated using values from the trace. In some exemplary embodiments, a state of the circuit may be obtained from a cycle in the trace, and an SEU in a node may be simulated by inverting the value of the node in a given cycle. The propagation of the SEU through the circuit may be simulated while making use of values of the trace from consecutive cycles. As an example, input values appearing in the trace may be used for the simulation. At each consecutive cycle, the propagation of the SEU may be determined based on whether a value of an examined node is inverted with respect to its recorded value in the trace at the same cycle. In case the value is inverted, the SEU may be deemed as propagating to the examined node. Otherwise, the SEU may not have propagated to the examined node. Computation of values of nodes during simulation may use values from the trace as well.

In some exemplary embodiments, the simulation may be performed by a simulator, such as an HDL software simulator, an emulator, a hardware accelerator, or the like. The simulation may simulate the operation of the circuit.

In some exemplary embodiments, simulation of the SEU propagating through the circuit may be performed until the SEU stops propagating or until the SEU affects a critical node. Other halting conditions may also apply as is explained hereinbelow.

In Step 340, it may be determined whether a soft error was inflicted. In some exemplary embodiments, it may be determined whether during the simulation of the SEU in Step 330, a soft error was inflicted. In some exemplary embodiments, the soft error may be inflicted in case the SEU has propagated to a critical node. Additionally or alternatively, the soft error may be inflicted in case the SEU has propagated to a conditional critical node in an enabled cycle. Additionally or alternatively, it may be approximated that a soft error was inflicted in case the SEU has propagated to over a maximum number of nodes within a single simulated cycle (e.g., during one simulated cycle there are over the maximum number of nodes that are inverted). Additionally or alternatively, it may be approximated that a soft error was inflicted in case the SEU has propagated to over a maximum number of nodes during the simulation (e.g., during simulation there are over the maximum number of nodes that were inverted). Additionally or alternatively, it may be approximated that a soft error was inflicted in case the SEU has propagated to over a maximum number of cycles during the simulation (e.g., the SEU continues to propagate over a predetermined depth). Additionally or alternatively, it may be approximated that a soft error was inflicted in case the SEU has propagated to a node that has an SEIP above a threshold value. Additionally or alternatively, it may be approximated that a soft error was inflicted if the original node we injected SEU on, still contains errors N [continuous or none continuous] cycles after the beginning, or in the last M continuous cycles (not necessarily from the beginning) The SEIP of the node may be computed in accordance with the disclosed subject matter or otherwise obtained, such as inputted by the user.

In some exemplary embodiments, it may not be decidable whether the SEU has inflicted a soft error or not, such as in case there are no sufficient consecutive cycles in the trace to determine whether or not the SEU propagates to a critical node or stops propagating. In such a case, it may be approximated that the SEU has inflicted a soft error; it may be approximated that the SEU has not inflicted a soft error; or the simulated SEU may be disregarded for computing the SEIP.

In some exemplary embodiments, Steps 330 and 340 may be repeated to simulate a plurality of SEUs to the same node. During each simulation it may be determined whether that simulated SEU has inflicted a soft error. In some exemplary embodiments, each simulated SEU in Step 330 may be performed with respect to a different state of the circuit. The different states may be obtained from different cycles in the trace. As an example, each after simulating an SEU at cycle X, an SEU may be simulated in cycle Y. In some exemplary embodiments, Steps 330 and 340 may be performed so as to simulate a predetermined number of SEUs to the node. Additionally or alternatively, SEUs may be simulated using cycles from the trace (or from multiple traces) until the predetermined number is reached, until there are no additional cycles to be used for simulating SEUs, or the like.

In Step 350, an SEIP of a node may be determined. The SEIP may be computed using the formula: SEIP=N/M, where N may be the total number of soft errors inflicted by the simulated SEUs, and M may be a total number of simulated SEUs to the node (optionally, excluding disregarded simulated SEUs). The SEIP may estimate or evaluate the probability that a soft error will be inflicted as a result from an SEU affecting the node.

In some exemplary embodiments, Steps 330-350 may be repeated each time with respect to other nodes, so as to determine the SEIP of the other nodes as well. In some exemplary embodiments, SEIP may be determined for a subset of the nodes of the circuit. The subset may be manually provided by the user. Additionally or alternatively, the subset may be computed automatically. In some exemplary embodiments, the subset may include the nodes which are in the LOI of the conditional and unconditional critical nodes. Nodes that are not in the LOI, may get the SEIP value of 0. Nodes that are in the LOI of reset signal of any flop or the LOI of the clock signal of any clock, may get the a special value like 1 (100%) that maybe user defined, to indicate they need protection In Step 360, a recommendation may be outputted. The recommendation may lobe output to a user, such as User 595 of FIG. 5. In some exemplary embodiments, the recommendation may comprise a list of nodes and their associated SEIP values. Additionally or alternatively, the recommendation may comprise a hardening recommendation for each node.

In some exemplary embodiments, hardening of the nodes (e.g. flops) may be performed based on the SEIP of the node. There may be multiple techniques to harden a node, where each technique may present a different tradeoff between circuit real-estate, power consumption, cost and resilience to SEUs. In some exemplary embodiments, different hardening techniques may be recommended. In some exemplary embodiments, the hardening recommendation may indicate which hardening technique to utilize for each node. As an example, a first technique may reduce the probability that an SEU will occur in the node to 0% and increase the real-estate of the node by 200%; a second technique may reduce the probability that an SEU will occur to 5% and may increase the real-estate of the node by 130%; a third technique may reduces the probability that an SEU will occur to 10% and may increase the real-estate of the node by 80%. In one embodiment, for a node having SEIP lower than 1%, the disclosed subject matter may recommend not to perform any hardening; for a node having SEIP greater than 1%, and smaller than 2%, the recommendation may be to perform the third technique; for a node having SEIP greater than 2%, and smaller than 5%, the recommendation may be to perform the second technique; and for a node having SEIP greater than 5%, the recommendation may be to use the first technique.

In some embodiments, the disclosed subject matter may automatically select the hardening method based on SEIP regardless of how the SEIP was calculated.

In some exemplary embodiments, the method of FIG. 3 may be performed with respect to multiple number of traces. The SEIP may be calculated based on aggregated values (e.g., aggregated N and M values). Additionally or alternatively, the SEIP may be calculated separately for each trace and the final SEIP may be determined based on the trace-specific SEIPs, such as by selecting the maximal trace-specific SEIP, by computing an average thereof, or the like.

Figure 4:
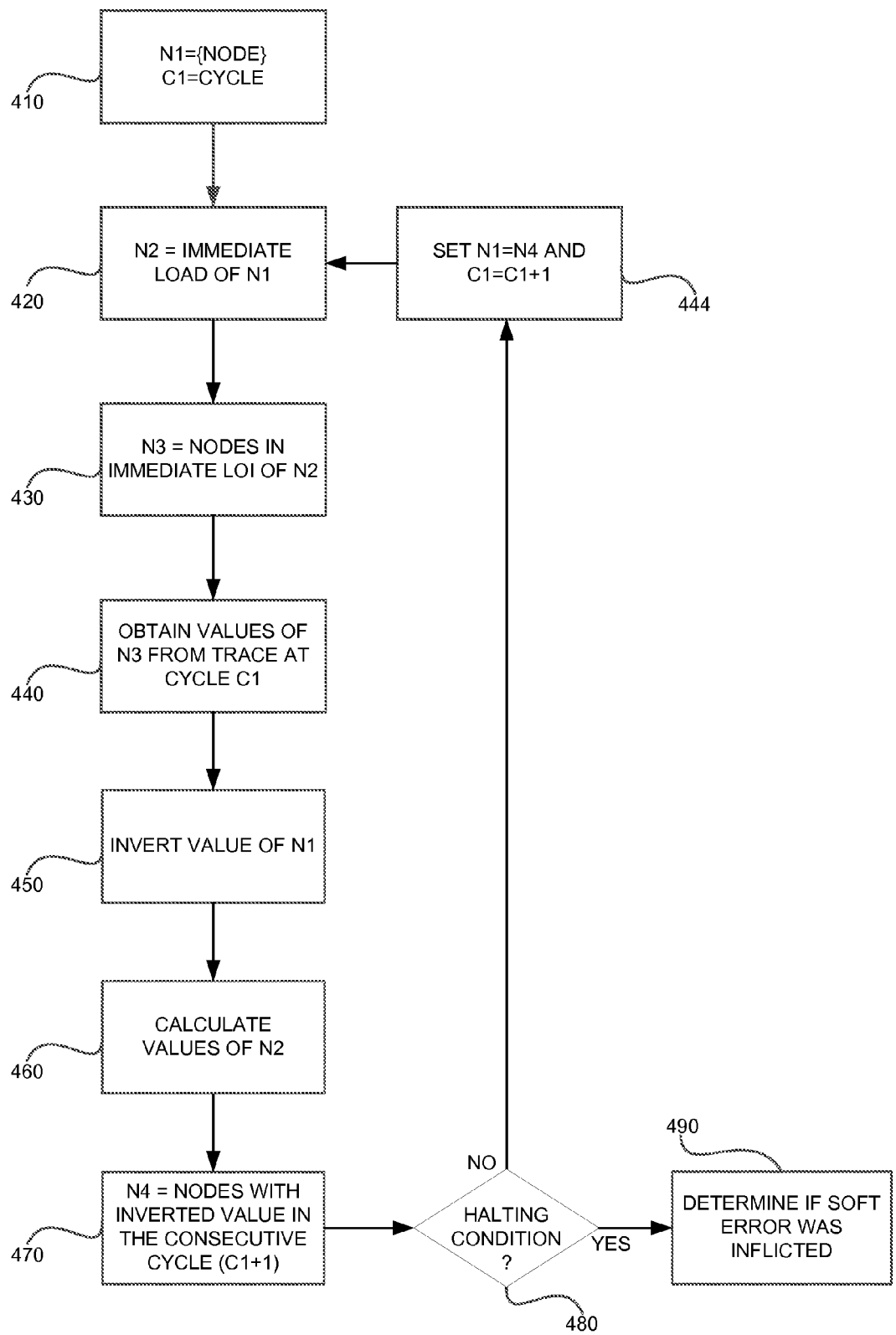
FIG. 4 shows a flowchart diagram of a method, in accordance with some exemplary embodiments of the disclosed subject matter.

Referring now to FIG. 4 showing a flowchart diagram of a method in accordance with some exemplary embodiments of the disclosed subject matter. In some exemplary embodiments, the method of FIG. 4 may be an embodiment used to perform Step 330 of FIG. 3. The method of FIG. 4 may simulate an SEU in a node at a cycle and simulate the propagation of the SEU in consecutive cycles. It will be noted, however, that the method may be applied on a set of nodes in which simultaneous SEU occurrence is simulated.

In Step 410, the node in which the SEU is simulated is obtained. $N_1$ may denote a set comprising the node. In some exemplary embodiments, $N_1$ may include an identification of the node. In some exemplary embodiments, the simulated node may be, for example, Flop 202 of FIG. 2, and $N_1$ may retain the ID of Flop 202. Steps 420-470 may be performed in order to simulate propagation of the SEU in the node in a consecutive cycle. In some exemplary embodiments, initial cycle may be obtained and denoted as $C_1$.

In Step 420, the immediate load of $N_1$ is computed. $N_2$ may be used to denote the immediate load of $N_1$. $N_2$ may include all nodes whose value may be changed in the consecutive cycle ($C_1+1$) due to a value change of $N_1$ in the cycle $C_1$. In some exemplary embodiments, $N_2$ may comprise a list of the nodes that are in the load of the one or more nodes stored in $N_1$. Following the example of Step 410, the $N_2$ may include Flops 206, and 210.

In Step 430, the immediate LOI of $N_2$ may be computed. $N_3$ may be used to denote the immediate LOI of $N_2$. $N_3$ may include all nodes that are used in calculating the value of $N_2$ in the consecutive cycle. In some exemplary embodiments, $N_3$ may comprise a list of the nodes that are in the immediate LOI of the nodes listed in $N_2$. Following the example of Step 420, $N_3$ may comprise Flops: 202, 203, 205 and 206.

In Step 440, values of the nodes listed in $N_3$ may be obtained from the cycle C1 of the trace.

In Step 450, out of the values obtained in Step 440, PVALUES, the values of the nodes listed in $N_1$ may be inverted. In some exemplary embodiments, the inversion may reflect the bit flip caused by the SEU or its propagation. Following the examples of Steps 440 and 410 the value of Flop 202 may be inverted.

In Step 460, the values of $N_2$ at the consecutive cycle ($C_1+1$) may be calculated and stored in NVALUES. In some exemplary embodiments, the calculation of the nodes listed in $N_2$ may be based on the values PVALUES of Step 440 and Step 450.

In Step 470, nodes whose value at the consecutive cycle (e.g., in PVALUES) are inverted with respect to the trace at cycle $C_1+1$ may be identified and stored in $N_4$. In some exemplary embodiments, a value of each node listed in $N_2$ at the consecutive cycle may be obtained from the trace and compared with the value calculated for the node in Step 460. $N_4$ may denote the nodes with inverted value at the consecutive cycle.

In Step 480, it may be determined whether a halting condition was reached. In case the halting condition is reached, the SEU simulation may end. If the halting condition is not reached the simulation may continue to a next cycle.

In some exemplary embodiments, the halting condition may be that the SEU has not propagated to the consecutive cycle. In case $N_4$ is an empty set, it may be determined that the SEU has not propagated to the consecutive cycle.

In some exemplary embodiments, the halting condition may be that the SEU propagated to a critical node. In case $N_4$ comprises a critical node, it may be determined that the SEU has inflicted a soft error and the SEU simulation may be ceased. Additionally or alternatively, in case $N_4$ comprises a conditional critical node, and the condition is held at the consecutive cycle, the soft error may be considered to have been inflicted and the SEU simulation may be ceased.

In some exemplary embodiments, the halting condition may be a condition that is used to approximate a soft error. The halting condition may be that the number of nodes in $N_4$ exceeds a maximum threshold (e.g., a number of nodes affected in a single cycle are above the threshold). Additionally or alternatively, the halting condition may be that throughout the simulation the number of bit flips (e.g., value inversions) that the SEU has stimulated is above a threshold (e.g., number of items in $N_4$ throughout the method is above the threshold). Additionally or alternatively, the halting condition may be that $N_4$ comprises at least one node having an SEIP above a threshold value. Additionally or alternatively, the halting condition may be that the there were over a threshold number of simulated cycles (e.g., the simulation exceeded a threshold depth from the cycle in which the SEU has occurred).

In some exemplary embodiments, a software error may be determined or approximated if there are at least a predetermined number of propagation to a critical node (e.g., 10 propagations or more to a same critical node). Additionally or alternatively, the software error may be determined or approximated if the SEU is propagated to at least a predetermined number of different critical nodes (e.g., propagated to 10 different critical nodes).

In some exemplary embodiments, the halting condition may be that there is no sufficient information to continue the simulation. As an example, there may not be information regarding a next cycle in the trace. In such a case, the question of whether a soft error was inflicted may not be decidable.

In case no halting condition was reached, Step 444 may be preformed. In Step 444, $N_1$ may be set to include the nodes of $N_4$. The examined cycle may be advanced to the next cycle. In some exemplary embodiments, the simulation may proceed in Steps 420-480 to simulate the next cycle. $N_1$ includes all the nodes whose value is inverted with respect to the value in the trace, as was computed during the previous iteration of Steps 420-480.

In case a halting condition was reached, Step 490 may be preformed. In Step 490, a decision if a soft error was inflicted may be determined or approximated. The decision may be based on the halting condition which was reached in Step 480.

Figure 5:
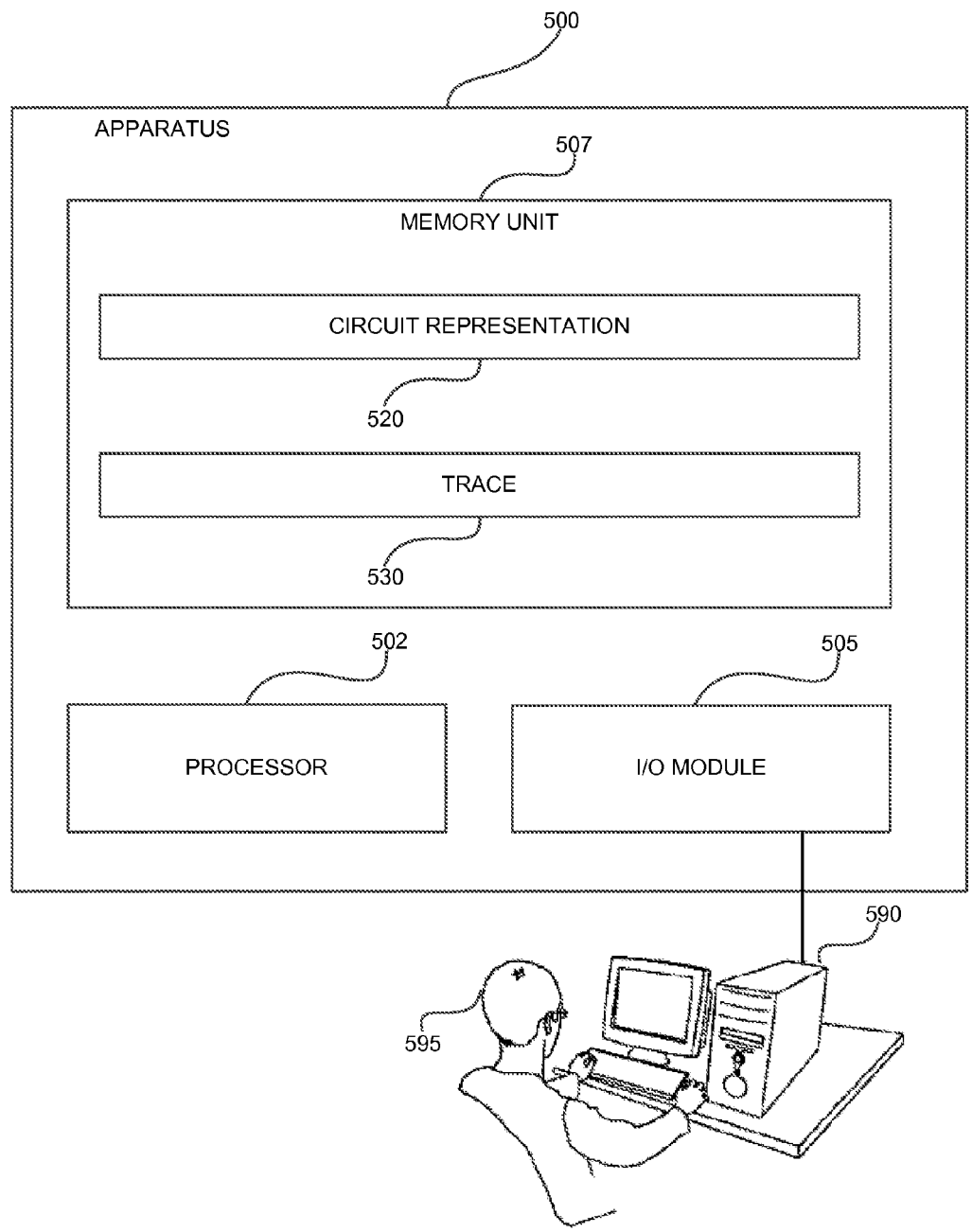
FIG. 5 shows a computerized environment in which the disclosed subject matter is used, in accordance with some exemplary embodiments of the subject matter.

Referring now to FIG. 5 showing an apparatus in accordance with some exemplary embodiments of the disclosed subject matter. An Apparatus 500 may be a computerized apparatus adapted to perform methods such as depicted in FIGS. 3 and 4.

In some exemplary embodiments, Apparatus 500 may comprise a Processor 502. Processor 502 may be a Central Processing Unit (CPU), a microprocessor, an electronic circuit, an Integrated Circuit (IC) or the like. Processor 502 may be utilized to perform computations required by Apparatus 500 or any of it subcomponents.

In some exemplary embodiments of the disclosed subject matter, Apparatus 500 may comprise an Input/Output (I/O) Module 505. I/O Module 505 may be utilized as an interface to transmit and/or receive information and instructions between Apparatus 500 and external I/O devices, such as a Workstation 590, or the like.

In some exemplary embodiments, I/O Module 505 and Workstation 590 may be used to provide an interface to a User 595 of the system, such as by providing output, visualized results, reports, or the like. In some exemplary embodiments, the output provided to User 595 may comprise SEIP values of the nodes, hardening recommendation the nodes, a combination thereof, of the like. In some exemplary embodiments, Workstation 590 may be used to obtain from User 595 parameters, such as, a typical trace, a circuit, a list of critical nodes, conditions of conditional critical nodes, simulation thresholds, cycle markers, a combination thereof, of the like.

In some exemplary embodiments, Apparatus 500 may comprise a Memory Unit 507. Memory Unit 507 may be a hard disk drive, a Flash disk, a Random Access Memory (RAM), a memory chip, or the like. In some exemplary embodiments, Memory Unit 507 may retain program code operative to cause Processor 502 to perform acts associated with any of the subcomponents of Apparatus 500, such as performing the acts associated with the steps shown in FIGS. 3 and 4.

In some exemplary embodiments, Memory Unit 505 may be used to retain components, such as, a Circuit Presentation 520, a Trace 530, or the like. In some exemplary embodiments, Circuit Presentation 520 may be, for example, a Netlist file describing a digital circuit design, such as depicted in FIG. 2. Circuit Presentation 520 may comprise nodes some of which may or may not be critical nodes and conditional critical nodes. In some exemplary embodiments, Trace 530 may comprise one or more trace files representing a simulation of a typical operation of the circuit design. Trace 530, such as, Trace 100 of FIG. 1, may be visualized as snapshot of a state machine that reveals the values of relevant nodes at each given cycle of the trace. In some exemplary embodiments, Trace 530 may be a product of the simulation, which may be performed by HDL software simulator, an emulator and a hardware accelerator, or the like. Additionally or alternatively, Trace 530 may include values of signals that are not nodes. Values of the signals that are not nodes may or may not be omitted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited Soto the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
obtaining a representation of a circuit, wherein the circuit comprises nodes, wherein the nodes comprise at least one critical node;
obtaining a trace, wherein the trace comprises recorded values of the nodes in a plurality of cycles;
determining, by a processor, a Soft Error Infliction Probability (SEIP) of a node, wherein the SEIP is a value representing a probability that a Single Event Upset (SEU) effecting the node in a cycle will inflict a soft error by propagating through the circuit to the at least one critical node, wherein said determining comprises simulating a propagation of the SEU from the cycle to consecutive cycles, wherein the consecutive cycles are successive cycles after the cycle, wherein said simulating utilizes values from the trace which are associated with the consecutive cycles, wherein the critical node is a conditional critical node having a condition on values of the circuit, wherein the condition is enabled in an enabling cycle, wherein the condition is held at the enabling cycle; wherein a discrepancy between a simulated value and a recorded value of a conditional critical node at the enabling cycle indicates a soft error; and
outputting the SEIP of the node.

2. A computer-implemented method comprising:
obtaining a representation of a circuit, wherein the circuit comprises nodes, wherein the nodes comprise at least one critical node;
obtaining a trace, wherein the trace comprises recorded values of the nodes in a plurality of cycles;
determining, by a processor, a Soft Error Infliction Probability (SEIP) of a node, wherein the SEIP is a value representing a probability that a Single Event Upset (SEU) effecting the node in a cycle will inflict a soft error by propagating through the circuit to the at least one critical node, wherein said determining comprises simulating a propagation of the SEU from the cycle to consecutive cycles, wherein the consecutive cycles are successive cycles after the cycle, wherein said simulating utilizes values from the trace which are associated with the consecutive cycles, wherein said simulating is performed until reaching at least one threshold selected from the group consisting of: a maximum number of inverted values within a simulated cycle; a maximum number of inverted values during said simulating; and a maximum number of simulated cycles during said simulating; and wherein in response to reaching the threshold, approximating that the SEU inflicts a soft error; and
outputting the SEIP of the node.

3. A computer-implemented method comprising:
obtaining a representation of a circuit, wherein the circuit comprises nodes, wherein the nodes comprise at least one critical node;
obtaining a trace, wherein the trace comprises recorded values of the nodes in a plurality of cycles;
determining, by a processor, a Soft Error Infliction Probability (SEIP) of a node, wherein the SEIP is a value representing a probability that a Single Event Upset (SEU) effecting the node in a cycle will inflict a soft error by propagating through the circuit to the at least one critical node, wherein said determining comprises simulating a propagation of the SEU from the cycle to consecutive cycles, wherein the consecutive cycles are successive cycles after the cycle, wherein said simulating utilizes values from the trace which are associated with the consecutive cycles, wherein said simulating further comprises repeatedly computing values of the nodes in a second cycle based on a first cycle and based on the trace, wherein said computing the values of the nodes in the second cycle comprises:
having a first portion of the nodes whose values in the first cycle are inverted with respect to recorded values of the trace;
determining a second portion of the nodes whose values in the second cycle are influenced by the values of the first portion in the first cycle;
computing values of the second portion using recorded values of the trace in the first cycle for any node not in the first portion and using inverted values of recorded values of the trace in the first cycle for any node in the first portion; and
comparing values of the second portion to identify a third portion of the nodes whose values in the second cycle are inverted with respect to recorded values of the trace; and
outputting the SEIP of the node.

4. A computer-implemented method comprising:
obtaining a representation of a circuit, wherein the circuit comprises nodes, wherein the nodes comprise at least one critical node;
obtaining a trace, wherein the trace comprises recorded values of the nodes in a plurality of cycles;
determining, by a processor, a Soft Error Infliction Probability (SEIP) of a node, wherein the SEIP is a value representing a probability that a Single Event Upset (SEU) effecting the node in a cycle will inflict a soft error by propagating through the circuit to the at least one critical node, wherein said determining comprises simulating a propagation of the SEU from the cycle to consecutive cycles, wherein the consecutive cycles are successive cycles after the cycle, wherein said simulating utilizes values from the trace which are associated with the consecutive cycles, wherein said simulating the propagation of the SEU is preformed until the SEU propagates to a second node having an SEIP above a threshold value, and wherein in response to the SEU propagating to the second node, approximating that the SEU inflicts a soft error; and
outputting the SEIP of the node.

5. A computer-implemented method comprising:
obtaining a representation of a circuit, wherein the circuit comprises nodes, wherein the nodes comprise at least one critical node;
obtaining a trace, wherein the trace comprises recorded values of the nodes in a plurality of cycles;
determining, by a processor, a Soft Error Infliction Probability (SEIP) of a node, wherein the SEIP is a value representing a probability that a Single Event Upset (SEU) effecting the node in a cycle will inflict a soft error by propagating through the circuit to the at least one critical node, wherein said determining comprises simulating a propagation of the SEU from the cycle to consecutive cycles, wherein the consecutive cycles are successive cycles after the cycle, wherein said simulating utilizes values from the trace which are associated with the consecutive cycles, wherein said determining the SEIP of the node further comprises:
for each cycle of a plurality of cycles in the trace:
simulating an SEU to the node in the cycle; and
simulating propagation of the SEU to determine whether the SEU inflicts a soft error; and computing the SEIP of the node by using the formula N/M, wherein N is a total number of soft errors inflicted by the simulated SEUs, wherein M is a total number of simulated SEUs to the node; and outputting the SEIP of the node.

6. The computer-implemented method of claim 5, wherein said determining the SEIP of the node further comprises: determining that at least one simulation of the SEU to the node in the cycle is inconclusive as to indicating an infliction of a soft error; and wherein said computing is performed while ignoring the at least one inconclusive simulation.

7. The computer-implemented method of claim 6, wherein said simulating is performed until the third portion either includes the critical node or until the third portion is empty.

8. A computer-implemented method comprising:

obtaining a representation of a circuit, wherein the circuit comprises nodes, wherein the nodes comprise at least one critical node;

obtaining a trace, wherein the trace comprises recorded values of the nodes in a plurality of cycles;

determining, by a processor, a Soft Error Infliction Probability (SEIP) of a node, wherein the SEIP is a value representing a probability that a Single Event Upset (SEU) effecting the node in a cycle will inflict a soft error by propagating through the circuit to the at least one critical node, wherein said determining comprises simulating a propagation of the SEU from the cycle to consecutive cycles, wherein the consecutive cycles are successive cycles after the cycle, wherein said simulating utilizes values from the trace which are associated with the consecutive cycles, wherein said simulating is performed by computing, in each cycle, values only to a subset of the nodes and using recorded values from the trace for other nodes not in the subset, wherein the subset of the nodes includes the nodes whose value is potentially effected by nodes whose simulated values in a previous cycle are different than corresponding recorded values in the trace; and outputting the SDP of the node.

9. The computer-implemented method of claim 8, wherein said simulating the propagation of the SEU is preformed until reaching a halting condition, wherein the halting condition is selected from the group consisting of: the SEU propagated to the at least one critical node; and the SEU stopped propagating.

10. The computer-implemented method of claim 8, further comprising outputting a hardening recommendation for the node, wherein the hardening recommendation is based on the SEIP of the node.

11. The computer-implemented method of claim 10 further comprises:

in response to determining that the SEIP is within a first range, outputting a recommendation to use a first hardening technique on the node;

in response to determining that the SEIP is within a second range, outputting a recommendation to use a second hardening technique on the node.

12. The computer-implemented method of claim 8, wherein said determining is performed with respect to a plurality of nodes comprised in the circuit, whereby a SEIP is determined for each node of the plurality of nodes, wherein said method comprises outputting a list of the plurality of the nodes and associated SEIP values of the plurality of nodes.

13. The computer-implemented method of claim 8, wherein a discrepancy between a simulated value and a recorded value of the critical node at a same cycle of the trace indicates a soft error.

14. The computer-implemented method of claim 8, wherein the node is a flop or a latch.

15. A computerized apparatus having a processor, the processor being adapted to perform the steps of claim 8.

16. A computer program product comprising a computer readable storage medium retaining program instructions, which program instructions when read by a processor, cause the processor to perform the method of claim 8.

* * * * *